United States Patent
Hama et al.

(10) Patent No.: US 8,929,212 B2
(45) Date of Patent: Jan. 6, 2015

(54) COMMUNICATION QUALITY MONITORING DEVICE, COMMUNICATION SYSTEM, COMMUNICATION QUALITY MONITORING METHOD AND PROGRAM THEREOF

(75) Inventors: Takayuki Hama, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 271 days.

(21) Appl. No.: 13/141,366

(22) PCT Filed: Dec. 18, 2009

(86) PCT No.: PCT/JP2009/071109
§ 371 (c)(1),
(2), (4) Date: Jun. 22, 2011

(87) PCT Pub. No.: WO2010/073979
PCT Pub. Date: Jul. 1, 2010

(65) Prior Publication Data
US 2011/0255437 A1    Oct. 20, 2011

(30) Foreign Application Priority Data
Dec. 25, 2008  (JP) ................. 2008-329558

(51) Int. Cl.
H04L 12/26     (2006.01)
H04L 12/28     (2006.01)
H04L 1/18      (2006.01)
H04L 1/20      (2006.01)
H04L 12/801    (2013.01)
H04L 12/835    (2013.01)

(52) U.S. Cl.
CPC ............... *H04L 1/1835* (2013.01); *H04L 1/20* (2013.01); *H04L 47/19* (2013.01); *H04L 47/30* (2013.01)
USPC .......................................... 370/230; 370/412

(58) Field of Classification Search
None
See application file for complete search history.

(56) References Cited

U.S. PATENT DOCUMENTS

| 5,541,912 A  * | 7/1996 | Choudhury et al. ........ 370/412 |
| 7,069,356 B2 * | 6/2006 | Meyer et al. ............... 370/252 |
| 2004/0111541 A1* | 6/2004 | Meyer et al. ............... 710/52 |
| 2005/0018617 A1* | 1/2005 | Jin et al. ................... 370/252 |
| 2005/0117583 A1* | 6/2005 | Uchida et al. .............. 370/235 |
| 2005/0147033 A1* | 7/2005 | Chin et al. ................. 370/229 |

FOREIGN PATENT DOCUMENTS

| JP | 5-48653 A    | 2/1993 |
| JP | 2003513534 A | 4/2003 |

(Continued)

OTHER PUBLICATIONS

International Search Report for PCT/JP2009/071109 mailed Jan. 19, 2010.

*Primary Examiner* — Gregory Sefcheck
*Assistant Examiner* — Joshua Smith
(74) *Attorney, Agent, or Firm* — Sughrue Mion, PLLC

(57) ABSTRACT

A communication quality monitoring device is provided which determines communication quality deterioration by variation of a transmission buffer length in session control irrespectively of generation/non-generation of a data loss.

A packet transmission and quality monitoring device 11-1 which detects deterioration in communication quality based on a buffer length of a session control protocol includes a threshold value calculating unit 11-17 which calculates a threshold value for the determination of deterioration in communication quality according to a parameter related to congestion detection of the session control protocol, and a deterioration determining unit 11-18 which determines deterioration in communication quality by comparing the threshold value and the buffer length.

22 Claims, 10 Drawing Sheets

(56) References Cited

FOREIGN PATENT DOCUMENTS

| JP | 2003249959 | | 9/2003 |
|---|---|---|---|
| JP | 3602072 | B | 12/2004 |
| JP | 2005328578 | A | 11/2005 |
| JP | 2006180002 | A | 7/2006 |
| JP | 2008078966 | A | 4/2008 |
| JP | 2008141777 | A | 6/2008 |

* cited by examiner

COMMUNICATION QUALITY MONITORING DEVICE, COMMUNICATION SYSTEM, COMMUNICATION QUALITY MONITORING METHOD AND PROGRAM THEREOF

INCORPORATION BY REFERENCE

This application is the National Phase of PCT/JP2009/071109, filed Dec. 18, 2009, which is based upon and claims the benefit of priority from Japanese patent application No. 2008-329558, filed on Dec. 25, 2008, the disclosure of which is incorporated herein in its entirety by reference.

TECHNICAL FIELD

The present invention relates to a communication quality monitoring device, a communication quality monitoring method and a program thereof and, more particularly, a communication quality monitoring device, a communication quality monitoring method and a program thereof which enable detection of deterioration in communication by a session control protocol.

BACKGROUND ART

Related art is disclosed in, for example, Patent Literature 1 through 3 for detecting deterioration in a communication quality at a TCP (Transmission Control Protocol) level as a session control protocol in an IP (Internet Protocol) network.

Patent Literature 1 discloses a method of measuring traffic of TCP by a measuring device provided between a transmission terminal and a reception terminal, calculating a logical throughput of the TCP from a network delay, a packet loss rate or the like measured by the measuring device, comparing the calculated logical throughput and an actual throughput and when the actual throughput is lower than the logical throughput, determining that performance is deteriorated.

Patent Literature 2 discloses a method of determining that communication is deteriorated when the number of TCP retransmission time-outs exceeds a threshold value according to a time and a procedure of a TCP packet.

Patent Literature 3 discloses a method of measuring a reciprocation delay time of a transmission terminal and a reception terminal and determining whether a response delay derives from a server terminal or a network based on three sensing results, a drastic increase in a reciprocation delay time, a slow increase of the same and a decrease in an advertisement window (the amount of use of a reception buffer on reception side) below a value set in advance.

Among related art for determining deterioration by a network repeater are, for example, the techniques disclosed in Patent Literature 4 and 5.

Patent Literature 4 discloses a traffic congestion symptom monitoring system which when traffic information (the amount of use of a communication buffer) in a network exceeds a predetermined threshold value, notifies to that effect.

Patent Literature 5 discloses a device which monitors a dedicated line transmission queue and when the transmission queue overs a predetermined length, determines that a flow of a transmission packet exceeds a dedicated line speed to distribute a part of packets to an ISDN line.

Patent Literature 1: U.S. Pat. No. 3,602,972
Patent Literature 2: Japanese Patent Laying-Open No. 2008-141777
Patent Literature 3: Japanese Patent Laying-Open No. 2006-180002
Patent Literature 4: Japanese Patent Laying-Open No. 2003-249959
Patent Literature 5: Japanese Patent Laying-Open No. H05-48653.

The methods disclosed by Patent Literature 1 and 2 have a problem that deterioration in communication quality cannot be determined in a section where no packet loss occurs. The problem could occur not only in communication using a packet but also in communication using data such as a cell or a frame.

The reason is that they are the determination methods premised on that communication quality deterioration is caused by generation of a packet loss. Even when no packet loss occurs, communication quality might be deteriorated due to a narrow link bandwidth with respect to a data input rate or due to a decrease in a speed-up rate in a session congestion control system under a large delay circumstance.

OBJECT OF THE INVENTION

An object of the present invention is to provide a communication quality monitoring device, a communication quality monitoring method and a program thereof which enable deterioration in communication quality in a session layer to be determined irrespectively of occurrence of a data loss.

SUMMARY

According to a first exemplary aspect of the invention, a communication quality monitoring device which detects deterioration in communication quality based on a buffer length of a session control protocol, includes a threshold value calculating unit which calculates a threshold value for the determination of deterioration in communication quality according to a parameter related to congestion detection of the session control protocol, and a deterioration determining unit which determines deterioration in communication quality by comparing the threshold value and the buffer length.

According to a second exemplary aspect of the invention, a communication system including a communication device which executes communication by a session control protocol and a communication quality monitoring device which is connected to the communication device through a communication network to detect deterioration in communication quality based on a buffer length of the session control protocol, wherein the communication quality monitoring device includes a threshold value calculating unit which calculates a threshold value for the determination of deterioration in communication quality according to a parameter related to congestion detection of the session control protocol, and a deterioration determining unit which determines deterioration in communication quality by comparing the threshold value and the buffer length.

According to a third exemplary aspect of the invention, a communication quality monitoring method of detecting deterioration in communication quality based on a buffer length of a session control protocol, includes a threshold value calculating step of calculating a threshold value for the determination of deterioration in communication quality according to a parameter related to congestion detection of the session control protocol, and a deterioration determining step of determining deterioration in communication quality by comparing the threshold value and the buffer length.

According to a fourth exemplary aspect of the invention, a communication quality monitoring program to be executed on a computer device which detects deterioration in communication quality based on a buffer length of a session control protocol, which causes the computer device to execute a threshold value calculating processing of calculating a threshold value for the determination of deterioration in communication quality according to a parameter related to congestion detection of the session control protocol, and a deterioration determining processing of determining deterioration in communication quality by comparing the threshold value and the buffer length.

The present invention enables communication quality deterioration to be determined irrespectively of generation of a data loss by calculating a threshold value of a buffer length for the determination of deterioration according to a congestion state.

EXEMPLARY EMBODIMENT

Next, modes of implementation of the present invention will be described in detail with reference to the drawings.

First Mode of Implementation

Figure 1:
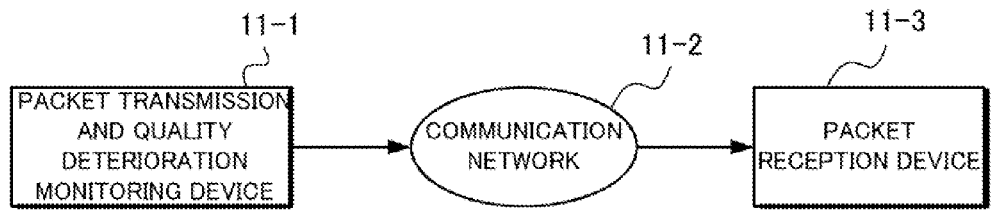
FIG. 1 is a block diagram showing an example of a structure of a first mode of implementation of the present invention.

FIG. 1 is a block diagram showing an example of a structure of a communication system to which communication quality monitoring is applied according to a first mode of implementation of the present invention.

With reference to FIG. 1, a packet transmission and quality deterioration monitoring device 11-1 as a communication device is connected to a packet reception device 11-3 through a communication network 11-2. The packet transmission and quality deterioration monitoring device 11-1 is a device which generates a packet by session control to monitor communication quality deterioration in session control. The packet reception device 11-3 is a device which receives a packet subjected to session control by the packet transmission and quality deterioration monitoring device 11-1.

Figure 2:
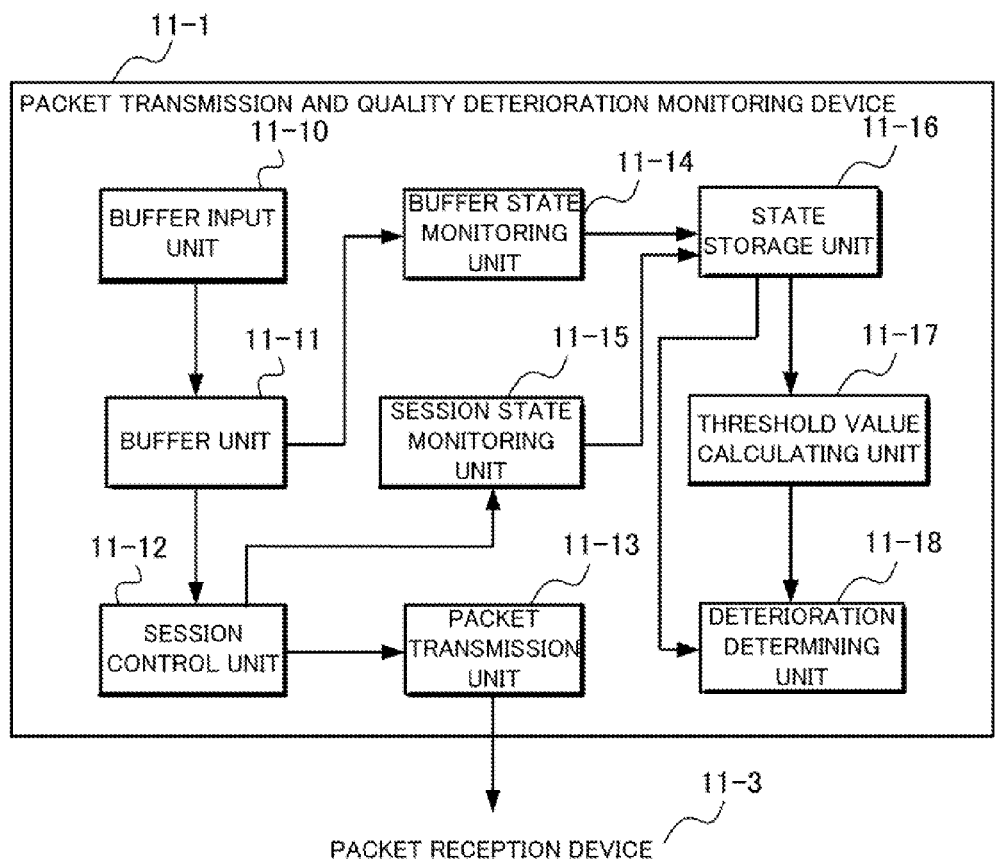
FIG. 2 is a block diagram showing an example of a structure of a packet transmission and quality deterioration monitoring device according to the first mode of implementation.

With reference to FIG. 2, description will be made of an example of a structure of the packet transmission and quality deterioration monitoring device 11-1.

With reference to FIG. 2, the packet transmission and quality deterioration monitoring device 11-1 includes a buffer input unit 11-10, a buffer unit 11-11, a session control unit 11-12, a packet transmission unit 11-13, a buffer state monitoring unit 11-14, a session state monitoring unit 11-15, a state storage unit 11-16, a threshold value calculating unit 11-17 and a deterioration determining unit 11-18.

The buffer input unit 11-10 is a part having a function of inputting data from an application or data received from another session to the buffer unit 11-11.

The buffer unit 11-11 is a part having a function of buffering data to be transmitted.

The session control unit 11-12 is a part having a function of generating a packet with respect to data stored in the buffer unit 11-11 based on session control. The session control includes congestion control.

The packet transmission unit 11-13 is a part having a function of transmitting a generated packet to the packet reception device 11-3.

The buffer state monitoring unit 11-14 is a part having a function of monitoring a buffer length of the buffer unit 11-11.

The session state monitoring unit 11-15 is a part having a function of monitoring a session control parameter. Here, the session control parameter includes a parameter related to congestion detection and a parameter related to speed control. Parameter related to congestion detection represents the number of retransmissions or the number of packet loss detections or a packet loss rate. Parameter related to speed control represents a communication rate, or a window and a reciprocation delay time. Window indicates the volume of transfer per one reciprocation delay time. Communication rate can be obtained by dividing a window by a reciprocation delay time.

The state storage unit 11-16 is a part having a function of storing a buffer length monitored by the buffer state monitoring unit 11-14 and a session control parameter monitored by the session state monitoring unit 11-15.

The threshold value calculating unit 11-17 is a part having a function of determining existence/non-existence of a congestion state based on a session control parameter older than an arbitrary time point t stored in the state storage unit 11-16 and obtaining a threshold value of a buffer length for use in determining deterioration of communication quality by the deterioration determining unit 11-18 based on existence/non-existence of the congestion state. Arbitrary time point t here is desirably a latest time point stored in the state storage unit 11-16.

The deterioration determining unit 11-18 is a part having a function of comparing a buffer length at an arbitrary time point t stored in the state storage unit 11-16 with a threshold value obtained by the threshold value calculating unit 11-17 to determine deterioration of communication quality. The deterioration determining unit 11-18 determines that quality is deteriorated when a buffer length is not less than a threshold value or overs the threshold value. As a buffer length to be compared, an average value of buffer lengths in proximity to the time point t may be used among buffer lengths stored in the state storage unit 11-16.

Structure of the threshold value calculating unit 11-17 will be described with reference to FIG. 3.

Figure 3:
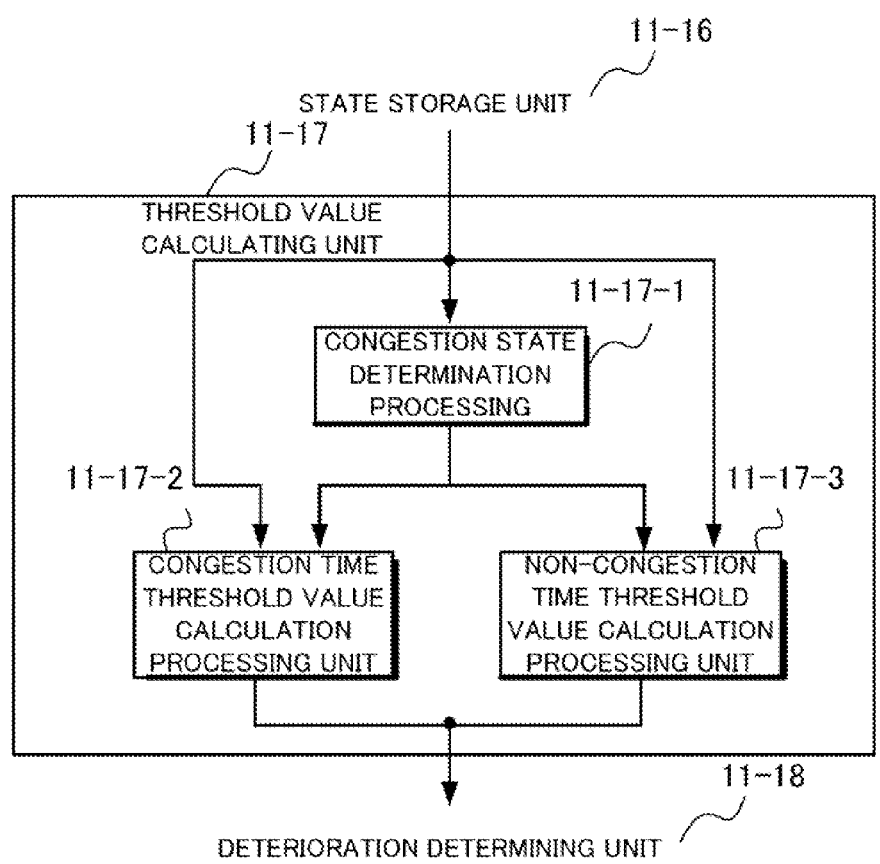
FIG. 3 is a block diagram showing an example of a structure of a threshold value calculating unit according to the first mode of implementation.

With reference to FIG. 3, the threshold value calculating unit 11-17 includes a congestion state determination processing unit 11-17-1, a congestion time threshold value calculation processing unit 11-17-2 and a non-congestion time threshold value calculation processing unit 11-17-3.

The congestion state determination processing unit 11-17-1 executes processing of determining whether it is in a congestion state or not based on a parameter whose number is increased along congestion detection which is stored in the state storage unit 11-16. Determination of a congestion state is made based on whether the number of session control parameters is increased in an arbitrary time period from t-d to t stored in the state storage unit 11-16.

Session control protocol, whose control is dependent on a packet reciprocation delay time, uses an arbitrary value larger enough than a packet reciprocation delay time as the time d in order to detect congestion at an interval larger than a control interval. When a measurement interval is larger enough than a packet reciprocation delay time of a session in question, a value proportional to the measurement interval may be used as the time d. Among session control parameters which will be increased in number as congestion is detected are the number of packet losses recognized in a congestion control protocol and the number of retransmissions when the congestion control protocol has a retransmission mechanism.

The congestion time threshold value calculation processing unit 11-17-2 executes processing of calculating a threshold value of a buffer length for the determination of deterioration (hereinafter referred to as a deterioration determination threshold value) by the deterioration determining unit 11-18 when the congestion state determination processing unit 11-17-1 determines the congestion state.

In the congestion state, a throughput largely varies because control is executed to avoid congestion in session control. Even when the volume of input data is constant, a variation range of a buffer length of the buffer unit 11-11 will be large. Accordingly, the congestion time threshold value calculation processing unit 11-17-2 obtains a deterioration determination threshold value according to a variation of the buffer length of the buffer unit 11-11.

Among methods of calculating a deterioration determination value for the time of congestion are a method based on a statistical value and a method based on a congestion control model expression in session control.

Figure 8:
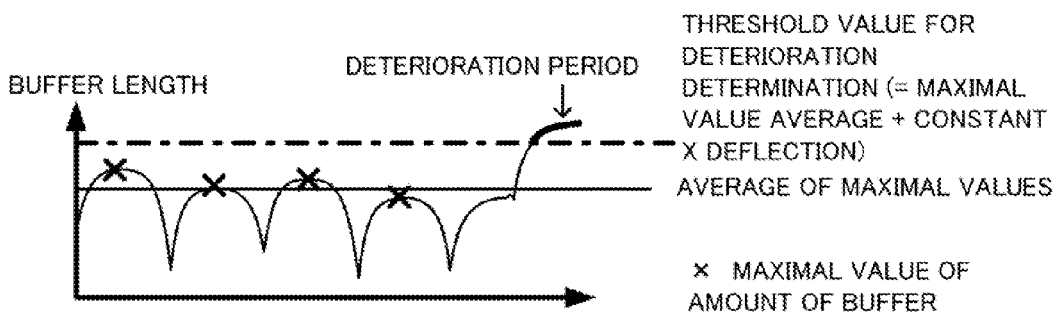
FIG. 8 is a diagram showing one example of a change of a buffer length of the buffer unit according to the first mode of implementation.

The method based on a statistical value is a method of obtaining a deterioration determination value from statistical values of past variation of the buffer length stored in the state storage unit 11-16. Specific manner of obtaining a value will be described with reference to FIG. 8. In this manner, a plurality of maximal values of buffer length variation are calculated to obtain a deterioration determination threshold value from an average of these maximal values. A deterioration determination threshold value is preferably an average of maximal values+constant x deflection. Deflection may be a standard deflection or an average deflection. Constant is preferably a value not less than "1".

The method based on a congestion control model expression in session control is a method of deriving an increase model expression of a communication rate parameter in advance, obtaining a maximum value of a buffer length when a communication rate is decreased due to N times of congestion prevention between time t−d and t based on the increase model expression and using the obtained maximum value to calculate a deterioration determination value.

The maximum value of a buffer length can be obtained by the following procedure. First, assume that an input data rate and a communication rate are coincident to have no variation in the buffer length and obtain, by a model expression f, a period from r1 to r2, which is from a time point where a decrease in the communication rate occurs due to N times of congestion prevention in succession until when the communication rate as of before the rate decrease occurs is restored. Next, add a buffer length as of before congestion prevention to a value obtained by integrating the model expression f by the period from r1 to r2. In this method, since a maximum value of the buffer length can be obtained only when r2−r1<d, t and d are set to have r2−r1<d.

Deterioration determination threshold value is preferably a maximum value of the obtained buffer length×(a constant not less than 1.0) or a maximum value of the obtained buffer length+(a constant not less than 0).

The present calculation method has a lower possibility of error detection than a method based on a statistical value because a threshold value is obtained based on behavior in session control at the time of congestion.

As to the method based on a statistical value and the method based on a congestion control model expression in session control, either one of them or both of them may be used. When both are used, it is preferable to use a maximum value among deterioration determination threshold values obtained by both the methods.

The non-congestion time threshold value calculation processing unit 11-17-3 executes the processing of calculating, when the congestion state determination processing unit 11-17-1 determines that it is not in the congestion state, a threshold value of the buffer length for the determination of deterioration (hereinafter referred to as a deterioration determination threshold value) by the deterioration determining unit 11-18.

Not in the congestion state, the buffer length of the buffer unit 11-11 will be increased when a link rate is lower than an input data rate or when a communication rate calculated by congestion control at the time of non-congestion is lower than the input data rate. The latter case will happen when time-out occurs after a burst loss such as a path change to result in making the communication rate be higher than an initial value or when a method by which an increase of the communication rate becomes smaller as a reciprocation delay time becomes longer is used as a congestion control system under a condition where a reciprocation delay time is long, or other cases.

In any case, if the volume of input data is monotonously increased or fixed, a buffer length shows a tendency of monotonous increase when the buffer length change is observed in as wide a time span as allows fluctuation of the buffer length due to burst in packet transmission processing or packet reception processing to be ignored. Deterioration determination threshold value at the time of non-congestion is calculated by using the monotonous increase tendency.

As a first method of calculating a deterioration determination threshold value at the time of non-congestion, provided is a method of considering a value calculated from a buffer length at an arbitrary time point t' stored in the state storage unit 11-16 as a deterioration determination threshold value. It is desirable to consider a buffer length+(a constant not less than 0) at the time point t' as a deterioration determination threshold value. Here, the time point t' is a time point stored by the state storage unit 11-16 prior to the latest time stored in the state storage unit 11-16 by more than a time interval in which buffer length fluctuation is ignorable. The time point t' is desirably a time point at which the congestion state determination processing unit 11-17-1 determines that it is not in congestion. Furthermore, as the time point t', the last deterioration determination time point may be used.

As a second method of calculating a deterioration determination threshold value at the time of non-congestion, provided is a method of obtaining a deterioration determination threshold value from a buffer length at a plurality of time points stored in the state storage unit 11-16. More specifically, the method includes extrapolating buffer lengths at a plurality of time points, estimating a buffer length as of a time point where the buffer length to be compared by the deterioration determining unit 11-18 is measured and making a deterioration determination threshold value be a value based on the estimated buffer length. It is preferable to make the deterioration determination threshold value be a deterioration estimated value+(a constant not less than 0). It is preferable to select a plurality of time points determined to have non-congestion in succession by the congestion state determination processing unit 11-17-1. As an extrapolation method, it is preferable to use linear approximation because of its simplicity. Since as compared with the first calculation method, the present calculation method has a narrower range in which determination of deterioration is made, an error detection possibility will be lower.

As to the first and second calculation methods, either one of them or both of them may be used. When both are used, it is desirable to use a maximum value among deterioration determination threshold values calculated by both the methods. It is also possible to add, to a result of the deterioration determining unit 11-18, a higher layer deterioration determining unit which determines deterioration in a higher layer such as an application based on a history of deterioration determination. The higher layer deterioration determining unit determines deterioration in the higher layer deterioration determining unit when the deterioration determining unit makes determination of deterioration n times (n is an arbitrary value not less 1) in succession. Threshold value n may be a constant or a value inversely proportional to an increase in the buffer length.

Operation of the First Mode of Implementation

Next, detailed description will be made of operation of the buffer input unit 11-10, the buffer unit 11-11 and the session control unit 11-12 of the packet transmission and quality deterioration monitoring device 11-1 according to the present mode of implementation with reference to the structural diagram in FIG. 2 and the flow charts in FIG. 4 through FIG. 6.

Figure 4:
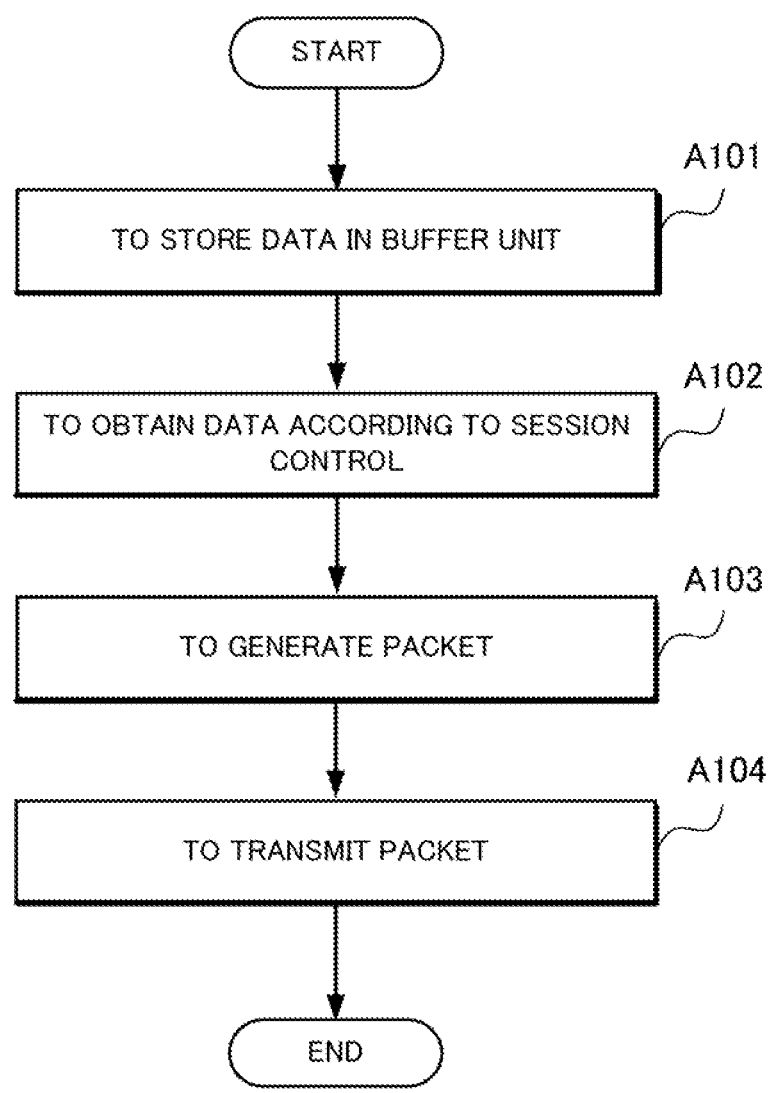
FIG. 4 is a flow chart showing operation of a buffer input unit, a buffer unit, a session control unit and a packet transmission unit according to the first mode of implementation.

The buffer input unit 11-10 stores data in the buffer unit 11-11 (Step A101 in FIG. 4). The session control unit 11-12 takes out the data from the buffer unit 11-11 according to session control (Step A102) to generate a packet (Step A103). The packet transmission unit 11-13 transmits the packet generated by the session control unit 11-12 to the packet reception device 11-3 (Step A104).

Figure 5:
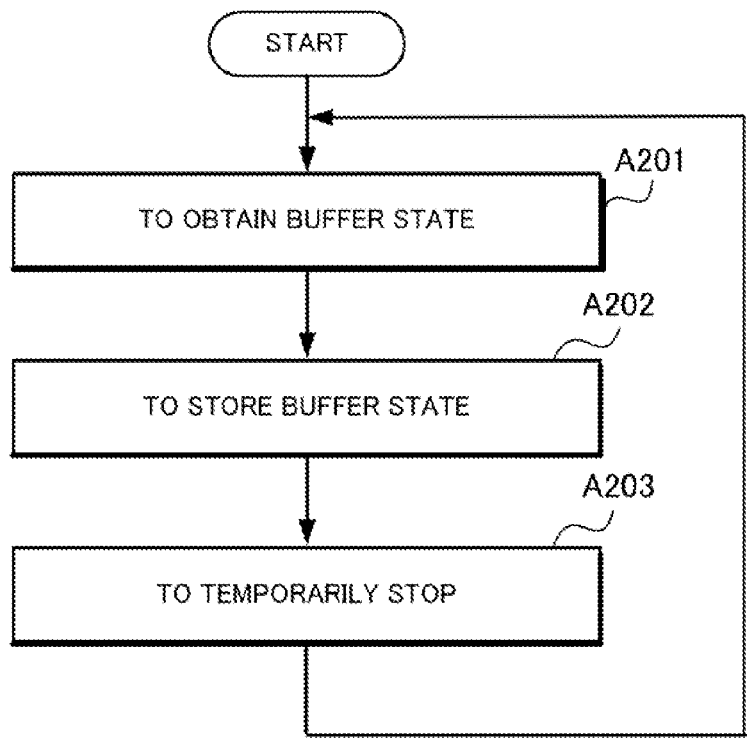
FIG. 5 is a flow chart showing operation of a buffer state monitoring unit and a state storage unit according to the first mode of implementation.

The buffer state monitoring unit 11-14 of the packet transmission and quality deterioration monitoring device 11-1 obtains a buffer state of the buffer unit 11-11 (Step A201 in FIG. 5). Store the obtained buffer state in the state storage unit 11-16 (Step A202). Thereafter, temporarily stop and obtain another buffer state (Step A203).

Figure 6:
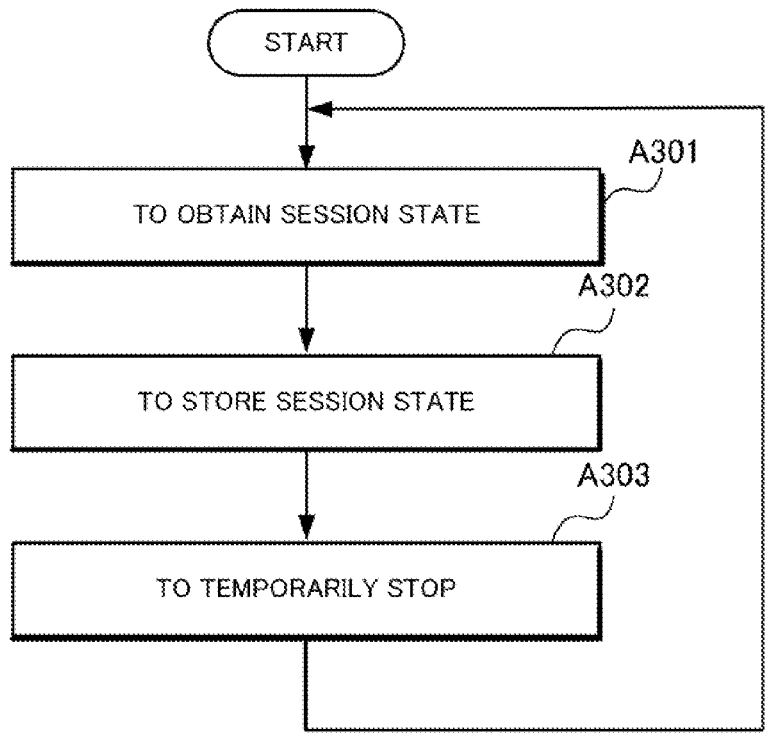
FIG. 6 is a flow chart showing operation of a session state monitoring unit and the state storage unit according to the first mode of implementation.

The session state monitoring unit 11-15 obtains a session state of the session control unit 11-12 (Step A301 in FIG. 6). Store the obtained session state in the state storage unit 11-16 (Step A302). Thereafter, temporarily stop and obtain another session state (Step A303).

Next, detailed description will be made of operation of the threshold value calculating unit 11-17 and the deterioration determining unit 11-18 of the present mode of implementation with reference to the structural diagrams in FIG. 2 and FIG. 3 and the flow chart in FIG. 7.

Figure 7:
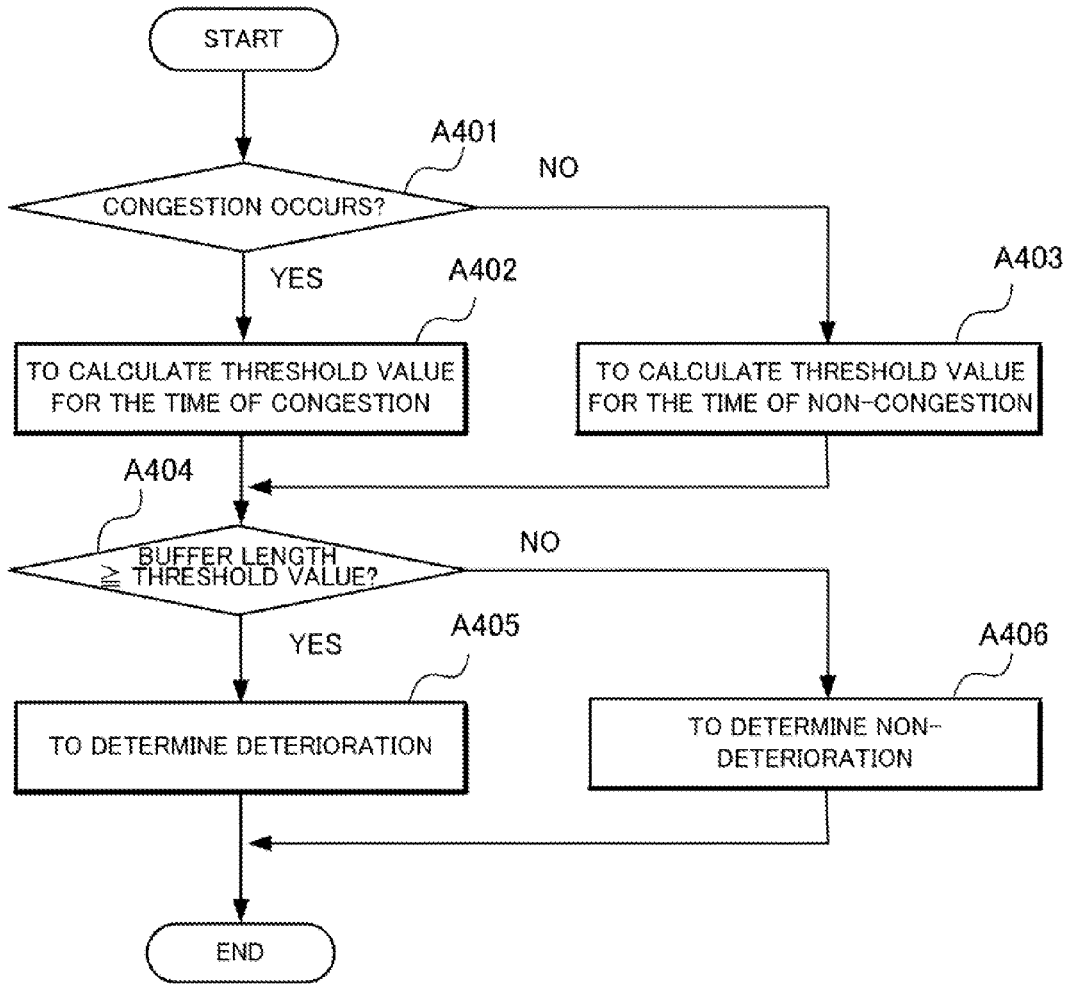
FIG. 7 is a flow chart showing operation of the threshold value calculating unit according to the first mode of implementation.

The congestion state determination processing unit 11-17-1 of the threshold value calculating unit 11-17 obtains a session state from the state storage unit 11-17 to determine whether congestion occurs (Step A401 in FIG. 7).

When congestion occurs, the congestion time threshold value calculation processing unit 11-17-1 calculates a deterioration determination threshold value for the time of congestion (Step A402). When no congestion occurs, the non-congestion time threshold value calculation processing unit 11-17-2 calculates a deterioration determination threshold value for the time of non-congestion (Step A403).

The deterioration determining unit 11-18 determines whether a buffer length stored in the state storage unit 11-17 is not less than a deterioration determination threshold value or larger than that (Step A404). When the condition is satisfied, determine that the communication quality is deteriorated (Step A405) and it is not satisfied, determine that the quality is not deteriorated (Step S406).

Effects of the First Mode of Implementation

Thus structured and operating first mode of implementation enables detection of deterioration in communication quality in a session control protocol at a node which terminates and relays the session control protocol and a node which receives data from an application to communicate by the session control protocol irrespectively of generation/non-generation of a packet loss.

More specifically, according to the first mode of implementation, the threshold value calculating unit 11-17 comprises the congestion state determination processing unit 11-17-1 which determines whether it is in the congestion state from a parameter related to congestion detection, the congestion time threshold value calculation processing unit 11-17-2 which calculates a threshold value of a buffer length when determining that it is in the congestion state, and the non-congestion time threshold value calculation processing unit 11-17-3 which calculates a threshold value of a buffer length when determining that it is not in the congestion state, so that calculation of a threshold value of a buffer length for the determination of deterioration according to a congestion state enables determination of communication quality deterioration irrespectively of generation/non-generation of a packet loss. The reason is that the congestion state determination processing determines whether it is in the congestion state or not to calculate a threshold value for the determination of deterioration according the congestion state.

In addition, the methods disclosed in Patent Literature 3 through 5 have a problem that because of difficulty in setting an appropriate threshold value, when a threshold value is small, a buffer increase will be detected due to fluctuation in packet arrival or temporary congestion to invite error detection of quality deterioration and when the threshold value is large, quality deterioration detection might be delayed depending on a buffer increase rate. The reason is that the threshold value is determined in advance without taking variation in an actual buffer length into consideration.

According to the present mode of implementation, since the congestion time threshold value calculation processing unit 11-17-2 and the non-congestion time threshold value calculation processing unit 11-17-3 calculate a deterioration determination threshold value according to a variation range of a buffer length, erroneous detection of quality deterioration or delay of quality deterioration detection can be prevented.

The methods disclosed in Patent Literature 1 and 2 have a problem that even if deterioration of a TCP session is detected, it is impossible to determine whether the deterioration of the TCP session level is related to deterioration of an application level. The reason is that because no relationship is seized between the volume of data input from an application and the volume of transferable data of TCP, it is impossible to determine whether a decrease in the volume of transferable data caused by the deterioration of the TCP session level affects transfer of input data.

Since according to the present mode of implementation, a buffer length of a buffer which temporarily preserves data to be transmitted by session control and a session control parameter are monitored and a buffer length deterioration determination threshold value is obtained for the determination of deterioration in communication quality according to existence/non-existence of a congestion state to determine whether the communication quality is deteriorated or not, it is possible to determine whether TCP session level deterioration is related to application level deterioration.

While the present mode of implementation has been described with respect to a case of one packet transmission and quality monitoring device 11-1 and one packet reception device 11-3, it can be realized also in a case where the packet transmission and quality monitoring device 11-1 and the packet reception device 11-3 are provided one to N or N to one or N to N in number without receiving constraints on number. The packet transmission and quality monitoring device 11-1 and the packet reception device 11-3 can be the same device.

Second Mode of Implementation

Next, a second mode of implementation of the present invention will be described in detail with reference to the drawings.

Figure 9:
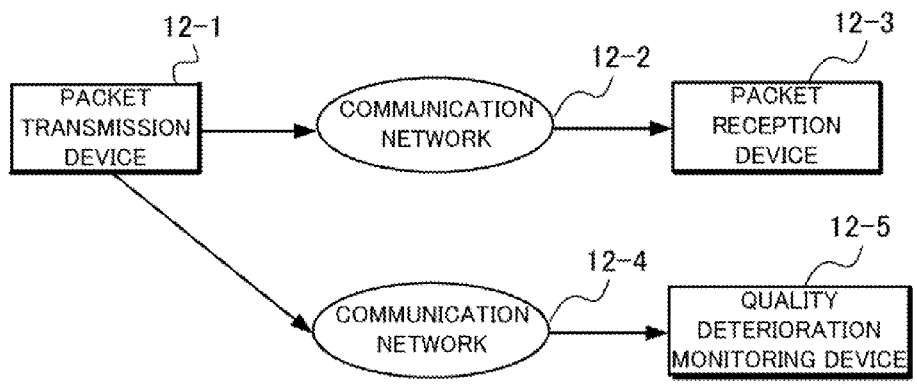
FIG. 9 is a block diagram showing an example of a structure of a second mode of implementation of the present invention.

FIG. 9 is a block diagram showing an example of a structure of a communication system to which the second mode of implementation of the present invention is applied.

With reference to FIG. 9, a packet transmission device 12-1 is connected to a packet reception device 12-3 through a communication network 12-2. The packet transmission device 12-1 is also connected to a quality deterioration monitoring device 12-5 through a communication network 12-4. The communication network 12-2 and the communication network 12-4 may be the same network or different networks, or one may be included in the other.

The packet transmission device 12-1 is a device which generates a packet by session control, sends the packet to the packet reception device 12-3 and sends a buffer length and a control state of the session control to the quality deterioration monitoring device 12-5. The packet reception device 12-3 is a device which receives a packet subjected to the session control by the packet transmission device 12-1. The quality deterioration monitoring device 12-5 is a device which monitors communication quality deterioration of the packet transmission device 12-1.

Description will be made of an example of a structure of the packet transmission device 12-1 with reference to FIG. 10.

Figure 10:
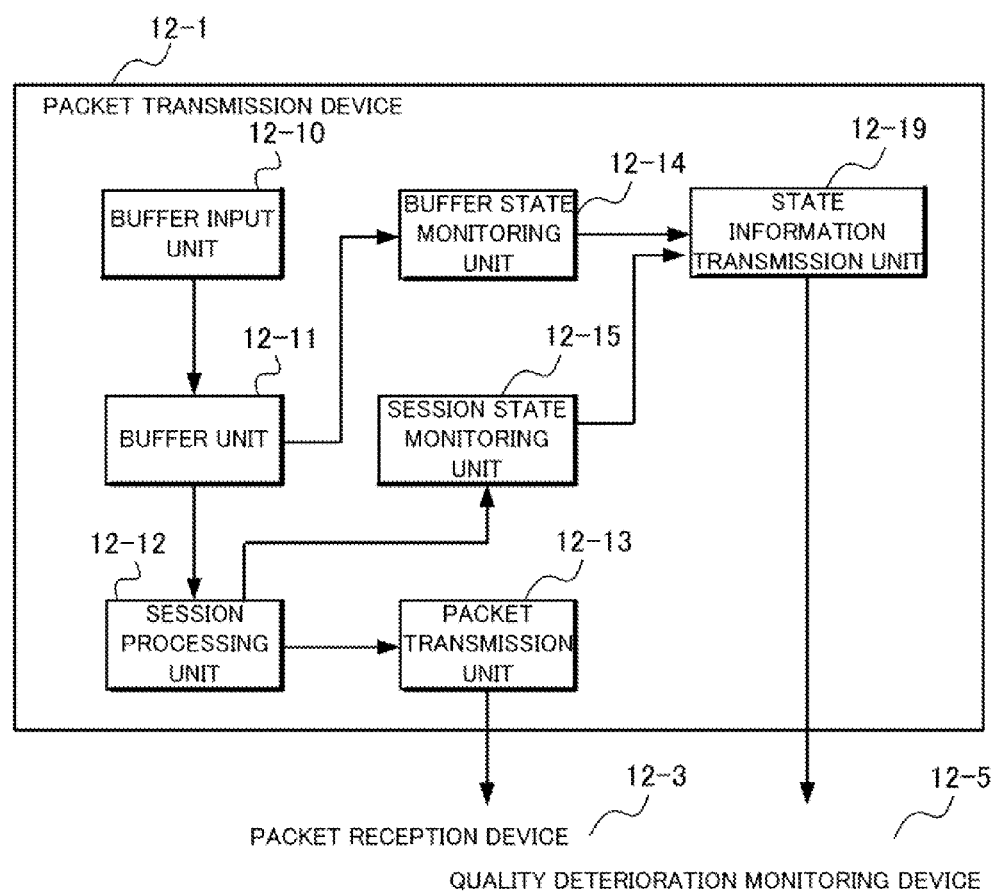
FIG. 10 is a block diagram showing an example of a structure of a packet transmission device according to the second mode of implementation.

With reference to FIG. 10, the packet transmission device 12-1 includes a buffer input unit 12-10, a buffer unit 12-11, a session processing unit 12-12, a packet transmission unit 12-13, a buffer state monitoring unit 12-14, a session state monitoring unit 12-15 and a state information transmission unit 12-19.

Since the buffer input unit 12-10, the buffer unit 12-11, the session processing unit 12-12, the packet transmission unit 12-13, the buffer state monitoring unit 12-14 and the session state monitoring unit 12-15 are the same as the buffer input unit 11-10, the buffer unit 11-11, the session processing unit 11-12, the packet transmission unit 11-13, the buffer state monitoring unit 11-14 and the session state monitoring unit 11-15 according to the above-described first mode of implementation, no detailed description will be made thereof.

The state information transmission unit 12-19 is a part having a function of notifying the quality deterioration monitoring device 12-5 of a buffer state monitored by the buffer state monitoring unit 12-14 and a session state monitored by the session state monitoring unit 12-15.

Description will be made of an example of a structure of the quality deterioration monitoring device 12-5 with reference to FIG. 11.

Figure 11:
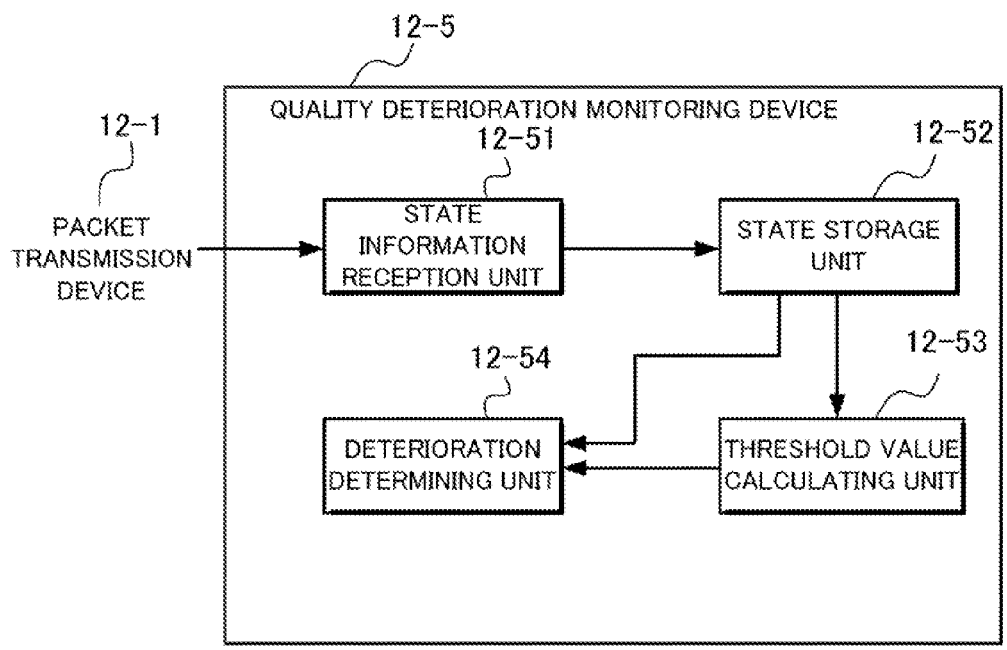
FIG. 11 is a block diagram showing a structure of a quality deterioration monitoring device according to the second mode of implementation.

With reference to FIG. 11, the quality deterioration monitoring device 12-5 includes a state information reception unit 12-51, a state storage unit 12-52, a threshold value calculating unit 12-53 and a deterioration determining unit 12-54.

The state information reception unit 12-51 is a part having a function of receiving a buffer state and a session state from the packet transmission device 12-1. Since the state storage unit 12-52, the threshold value calculating unit 12-53 and the deterioration determining unit 12-54 are the same as the state storage unit 11-16, the threshold value calculating unit 11-17 and the deterioration determining unit 11-18 according to the above-described first mode of implementation, no detailed description will be made thereof.

Operation of the Second Mode of Implementation

Figure 13:
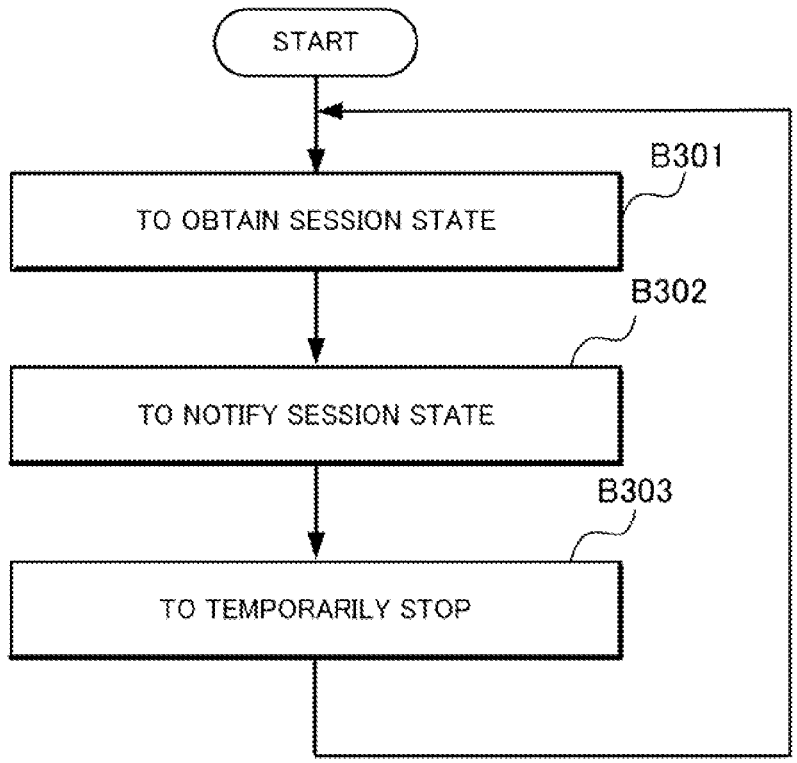
FIG. 13 is a flow chart showing operation of a session state monitoring unit and the state information storage unit according to the second mode of implementation.
Figure 14:
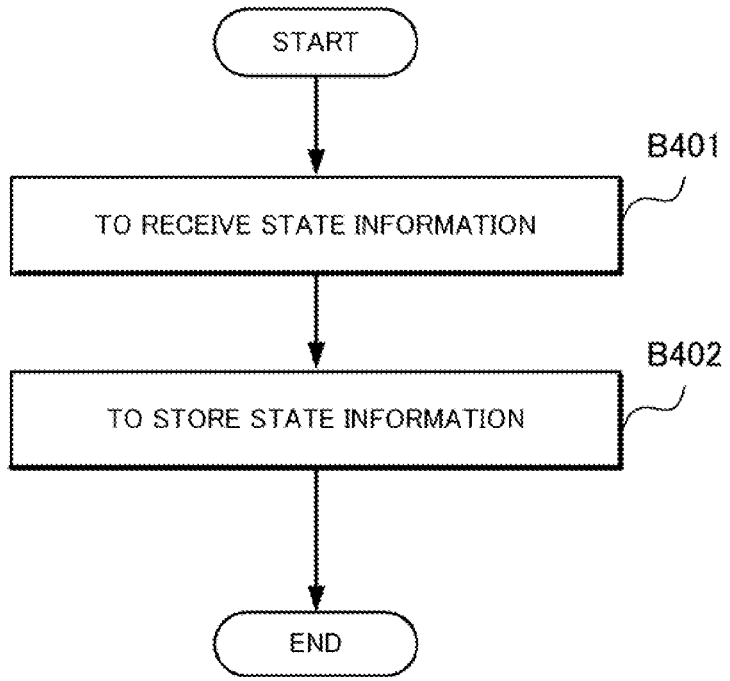
FIG. 14 is a flow chart showing operation of a state information monitoring unit and the state information storage unit according to the second mode of implementation.

Next, detailed description will be made of operation of the second mode of implementation with reference to the flow charts of FIG. 12 through FIG. 14.

Since operation of the buffer input unit 12-10, the buffer unit 12-11, the session processing unit 12-12 and the packet transmission unit 12-13 of the packet transmission device 12-1 of FIG. 10 is the same as the operation shown at Step A101 through A104 in FIG. 4 of the buffer input unit 11-10, the buffer unit 11-11 and the session control unit 11-12 shown in FIG. 2 according to the first mode of implementation, no detailed description will be made thereof.

Next, detailed description will be made of operation of the buffer state monitoring unit 12-14, the session state monitoring unit 12-15 and the state information transmission unit 12-19 of the packet transmission device 12-1 with reference to FIG. 10 and the flow charts in FIG. 12 and FIG. 13.

Figure 12:
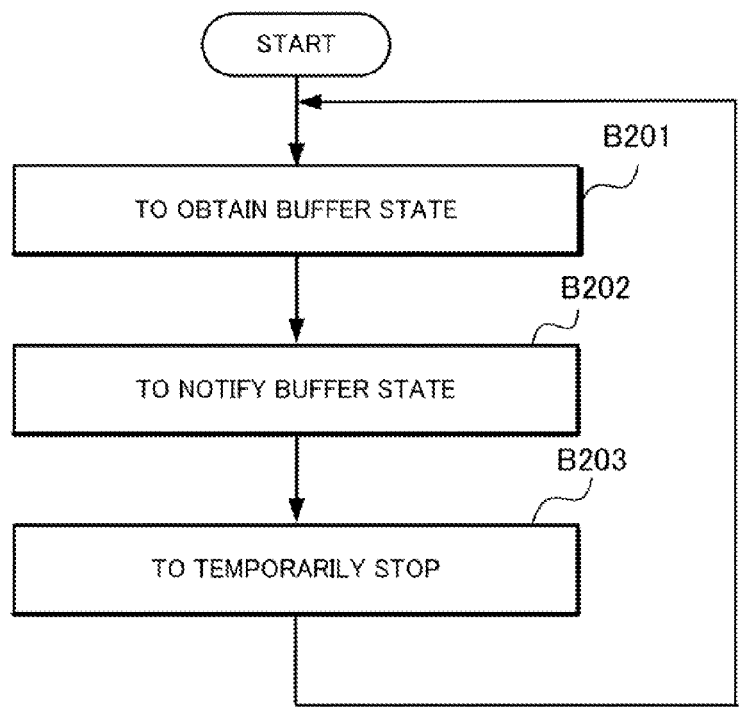
FIG. 12 is a flow chart showing operation of a buffer state monitoring unit and a state information storage unit according to the second mode of implementation.

The buffer state monitoring unit 12-14 obtains a buffer state of the buffer unit 12-11 (Step B201 in FIG. 12). The state information transmission unit 12-19 notifies the quality deterioration monitoring device 12-5 of the obtained buffer state (Step B202). Thereafter, temporarily stop to obtain another buffer state (Step B203).

The session state monitoring unit 12-15 obtains a session state of the session control unit 12-12 (Step B301). The state information transmission unit 12-19 notifies the quality deterioration monitoring unit 12-5 of the obtained buffer state (Step B202). Thereafter, temporarily stop to obtain another session state (Step B303).

Next, detailed description will be made of operation of the quality deterioration monitoring device 12-5 with reference to FIG. 11 and FIG. 14.

The state information reception unit 12-51 receives state information from the packet transmission device 12-1 (Step B401 in FIG. 14) and stores the same in the state storage unit 12-52 (Step B402).

Since operation of the threshold value calculating unit 12-53 and the deterioration determining unit 12-54 is the same as the operation of Steps A401 through A406 of the threshold value calculating unit 11-17 and the deterioration determining unit 11-18 shown in FIG. 7 according to the first mode of implantation, no detailed description will be made thereof.

Effects of the Second Mode of Implementation

Similarly to the first mode of implementation, thus structured and operating second mode of implementation enables deterioration in a communication quality to be determined by calculating a threshold value of a buffer length for the determination of deterioration according to a congestion state irrespectively of generation/non-generation of a packet loss.

While the second mode of implementation has been described with respect to a case of one packet transmission device 12-1 and one packet reception device 12-3, it can be realized also in a case where the packet transmission device 12-1 and the packet reception device 12-3 are provided one to N or N to one or N to N in number without receiving constraints on number.

While the description has been made with respect to a case of one packet transmission device 12-1 and one quality monitoring device 12-5, it can be realized also in a case where the packet transmission device 12-1 and the quality monitoring device 12-5 are provided one to N or N to one or N to N in number without receiving constraints on number.

The packet transmission device 12-1 and the packet reception device 12-3 can be the same device. Alternatively, the packet transmission device 12-1 and the quality monitoring device 12-5 can be the same device. Alternatively, the packet reception device 12-3 and the quality monitoring device 12-5 can be the same device.

The threshold value calculating unit 11-17 according to the first mode of implementation and the threshold value calculating unit 12-53 according to the second mode of implementation calculate a threshold value for the determination of deterioration according to whether congestion occurs or not. It is also possible, not according to whether congestion occurs, to determine congestion as a plurality of congestion states according to the amount of increase in parameters which will be increased in number along with congestion detection, thereby calculating a threshold value for the determination of deterioration on a congestion state basis.

Further possible is to determine congestion as a plurality of congestion states according to the amount of increase in parameters which will be increased along congestion detection, calculate a plurality of threshold values according to a congestion state and determine the degree of deterioration based on the plurality of threshold values.

While the first and second modes of implementation have been described with respect to an example where data is communicated using a packet, they can be realized by any method in which communication is executed with data such as a cell or a frame other than a packet sectioned.

The first and second modes of implementation have been described with respect to a case where the threshold value calculating unit 11-17 and the threshold value calculating unit 12-53 have a procedure of determining congestion. Without the procedure for determining congestion, the threshold value calculating unit 11-17 and the threshold value calculating unit 12-53 may obtain a threshold value of a buffer length for the determination of deterioration based on buffer lengths obtained prior to an arbitrary time point t which are stored in the state storage unit 11-16. The procedure of obtaining a threshold value in this case is the same as that of the non-congestion time threshold value calculation processing unit 11-17-2.

Figure 17:
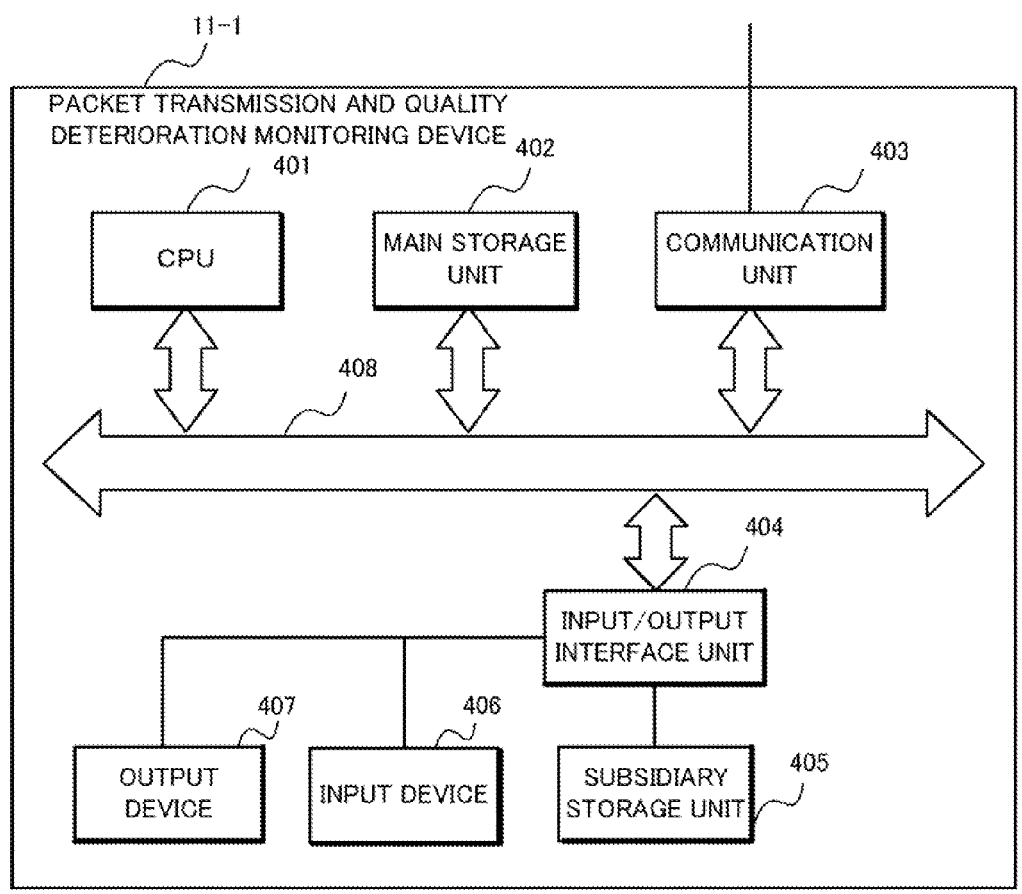
FIG. 17 is a block diagram showing an example of a hardware structure of the packet transmission and quality deterioration monitoring device according to the first mode of implementation.

FIG. 17 is a block diagram showing an example of a hardware structure of the packet transmission and quality deterioration monitoring device 11-1 according to the first mode of implementation.

With reference to FIG. 17, the packet transmission and quality deterioration monitoring device 11-1, which can be realized by the same hardware structure as that of a common computer device, comprises a CPU (Central Processing Unit) 401, a main storage unit 402 formed of a RAM (Random Access Memory) for use as a data working region or a data temporary saving region, a communication unit 403 which transmits and receives data to and from other node through a network, an input/output interface unit 404 connected to an external device to transmit and receive data, a subsidiary storage unit 405 which is a hard disk device formed of a non-volatile memory such as a ROM (Read Only Memory), a magnetic disk or a semiconductor memory, an input device 406 such as a keyboard or a mouse, an output device 407 such as a display device, and a system bus 408 which connects the above-described respective components with each other.

The packet transmission and quality deterioration monitoring device 11-1 according to the present mode of implementation has its operation realized not only in hardware by mounting a circuit part as a hardware part such as an LSI (Large Scale Integration) with a communication quality monitoring program incorporated which executes processing of the session control unit 11-12, the buffer state monitoring unit 11-14, the session state monitoring unit 11-15, the threshold value calculating unit 11-17, the deterioration determining unit 11-18 and the like but also in software by storing a program which provides each function of the session control unit 11-12, the buffer state monitoring unit 11-14, the session state monitoring unit 11-15, the threshold value calculating unit 11-17 and the deterioration determining unit 11-18 into the subsidiary storage unit 405, loading the program into the main storage unit 402 and executing the same by the CPU 401.

Although FIG. 17 has been described with respect to an example of a hardware structure of the packet transmission and quality deterioration monitoring device 11-1, the quality deterioration monitoring device 12-5 according to the second mode of implementation also has the same structure as that shown in FIG. 17.

Exemplary Embodiment

Next, a specific exemplary embodiment of the above-described modes of implementation will be described.

The first and second modes of implementation can be embodied on an IP network by using TCP as a session control system. In this case, since TCP has a retransmission mechanism, the number of packet losses or the number of packet retransmissions is used as a parameter whose number is increased along congestion detection.

As a TCP congestion control system, a congestion control system called TCP-Reno is widely used. In a congestion avoiding phase as a normal state except an initial state, a parameter for adjusting the volume of transmission data per one RTT (Round Trip Time) called a congestion window (hereinafter, referred to as a CWND: congestion window) is increased by 1/1RTT packet per 1ACK (ACKnowledgement), that is, one packet per 1RTT. Accordingly, a communication rate parameter increase model expression f will be expressed as f(t)=1/RTT [packet/unit time]. When a packet loss is detected, after completely retransmitting the lost packet, CWND is halved to again enter the congestion avoiding phase. As a result, even when a plurality of packets are lost per one RTT, packet loss detection is counted as one. As a buffer unit monitored by the buffer state monitoring unit, it may be a buffer of a TCP stack or a buffer on an application side provided when calling up a transmission function in SOCKT as an API (Application Programming Interface) of TCP. Both a TCP stack buffer and an application side buffer may be included.

Figure 15:
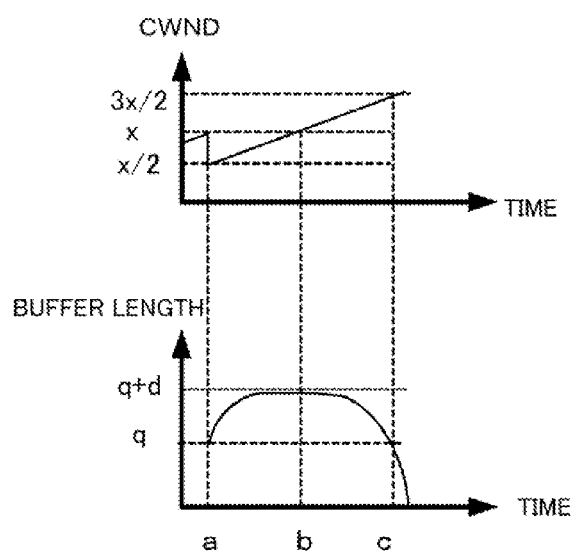
FIG. 15 is a diagram showing an example of CWND variation and buffer length variation of TCP according to a present exemplary embodiment of the present invention.

With reference to FIG. 15, description will be made of variation of CWND and a TCP transmission buffer in a case where, when assuming that the volume of input data and the volume of output data by TCP are balanced immediately before a packet loss, no packet loss occurs thereafter for a while. With a CWND value as of immediately before a packet loss (time a in FIG. 15) as x packet, CWND will be 1/2x due to a packet loss and when CWND continues increasing to return to x (time b), the TCP transmission buffer length will be the largest and when CWND attains 3/2x (time c), the buffer length will return to a value as of before the packet loss.

In the present exemplary embodiment, a deterioration determination threshold value at the congestion time threshold value calculation processing unit 11-17-1 for the time of congestion is calculated by a method based on a congestion control model expression in session control. Logically obtain a buffer length at the time point of time b in FIG. 15 and obtain a deterioration determination threshold value from the buffer length.

When packet loss detection is once, with a time 1RTT as r, the time period from a to b will have r*x/2. Since the amount of increased of a buffer length in this period will be a discrete integral of a communication rate parameter increase model expression f in the time period from a to b, it can be calculated by:

$$r*\text{ceil}(x/2)+r*(\text{ceil}(x/2)-1)+\ldots+r*3+r*2+r*(x/2-\text{floor}(x/2))=r/2*(\text{ceil}(x/2)*(\text{ceil}(x/2)+1)-1)+r*(x/2-\text{floor}(x/2)) \quad \text{Expression (1)}$$

(in which ceil(x) is a minimum integer value not less than x and floor(x) is a maximum integer value not more than x).

When packet loss detection occurs N times in succession (when halving the CWND due to packet loss detection, retransmission and congestion prevention repeats N times in succession), after successive packet losses, CWND of the congestion window goes $1/2^N x$, so that the time period from a to b will have $r \times (1-1/2^N)$. The amount of increased of a buffer length in this period can be calculated by:

$$r*(x-\text{floor}(1/2^N x))+r*(x-\text{floor}(1/2^N x)-1+\ldots+r*3+r*2+r*(1/2^N x-\text{floor}(1/2^N x))=r/2*((x-\text{floor}(1/2^N x))(x-\text{floor}(1/2^N x)+1)-1)+r*(1/2^N x-\text{floor}(1/2^N x)) \quad \text{Expression (2)}.$$

When a delay ACK option is valid, since the number of ACK will be 1/2 in general, a range of an increase of CWND will be 1/2 per unit time to take the double time for reaching the CWND, resulting in doubling the amount of an increase d in a buffer length.

Furthermore, taking a retransmission time into consideration, add the following expression to the amount of an increase d in a buffer length:

$$r*(x-\text{floor}(1/2^N x))+r*(x-\text{floor}(1/2^N-1x))+r*(x-\text{floor}(1/2^2 x))+r*(x-\text{floor}(1/2^1 x)) \quad \text{Expression (3)}.$$

The buffer length at the time point of time b will be a value obtained by adding the amount of increase d in buffer length to a buffer length q as of immediately before packet loss (time a).

Figure 16:
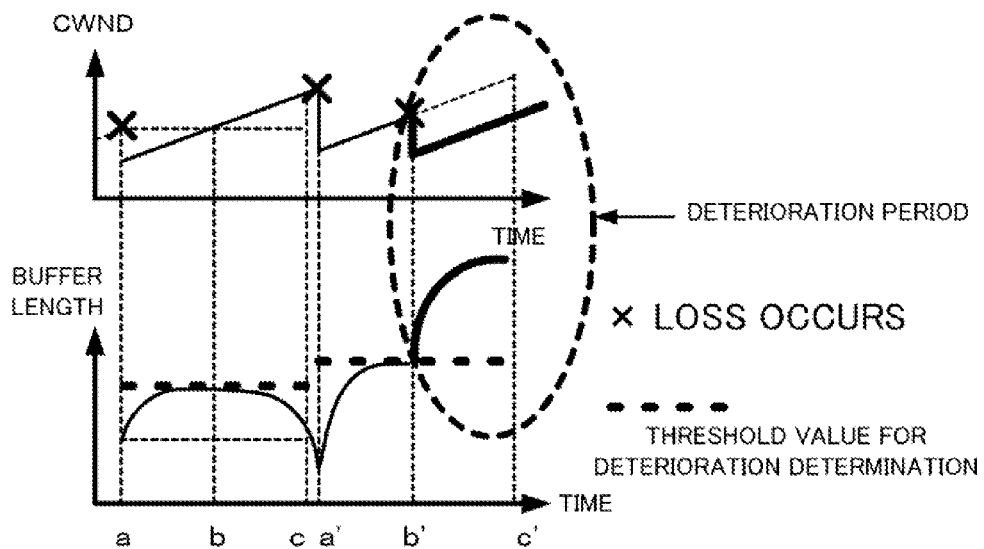
FIG. 16 is a diagram showing an example of CWND variation, buffer length variation of TCP and a deterioration determination threshold value according to the present exemplary embodiment of the present invention.

Next, description will be made of a relationship between a deterioration determination threshold value and a packet loss with reference to FIG. 16. Set a deterioration determination threshold value as a buffer length at a time point of the time b obtained with N as 1. While in a case of one packet loss as in a section ac, the buffer length fails to exceed the deterioration determination threshold value, in a case of two packet losses as in a section a'c', the buffer length exceeds the deterioration determination threshold value to determine that communication quality is deteriorated.

On the current operating system (OS), mounted is a TCP having a congestion control system whose rate is higher than TCP-Reno particularly under a large delay and wide band environment and which has fairness with TCP-Reno at the time of congestion. More specifically, on the Windows Server 2008, the Compound TCP is mounted and on Linux, the CUBIC-TCP is mounted, which are used as an OS standard. A deterioration determination threshold value may be obtained based on a communication rate parameter increase model expression of these high-speed TCP. Although when a deterioration determination threshold value is used on the premise of TCP-Reno, the value will be larger than a deterioration determination threshold value on the premise of a high-speed TCP to invite a delay in determination, it will cause no big problem because no erroneous determination will be made.

In the present exemplary embodiment, a deterioration determination threshold value for the time of non-congestion in the non-congestion time threshold value calculation processing unit is obtained from buffer lengths at a plurality of time points. More specifically, linearly extrapolate a buffer length as of t-time prior to a latest time recorded and a buffer length as of 2t-time prior to the same to estimate a buffer length at the latest time and take the value as a deterioration determination threshold value.

Also executable is in SCTP (Stream Control Transmission Protocol) having the same congestion control as TCP-Reno.

In the first and second modes of implementation, DCCP (Datagram Congestion Control Protocol) can be executed as a session control system on the IP network. Since DCCP has no retransmission mechanism, the number of packet losses or a packet loss rate is used as a parameter whose number is increased as congestion detection.

DCCP has its congestion control algorithm changeable by a CCID (Congestion Control ID) parameter. As the CCID, a mode 2 and a mode 3 are defined at the current time point.

In the mode 2, transmission control is executed using a congestion window whose variation is the same as that of TCP-Reno. Accordingly, the present invention can be implemented by the same manner as that of TCP-Reno.

In the mode 3, transmission control is executed using a transmission rate which is set to be a value of a logical throughput of TCP-Reno obtained from a delay or a packet loss rate. The rate is set not to vary more than double 1RTT. Since a rate variation is small as compared with that in the mode 2, calculation of a deterioration determination threshold value for the time of congestion at the congestion time threshold value calculation processing unit 11-17-2 employs a method based on a statistical value.

Also executable is in a system in which the same congestion control mechanism as that of DCCP is mounted on a UDP (User Datagram Protocol). Further executable is in a system in which a congestion control mechanism of either one of the modes 2 and 3 of CCID of DCCP is mounted on UDP.

The present exemplary embodiment has been described with respect to an example of execution on IP network. The present invention can be embodied on other network than the IP network as long as it uses a session control protocol for congestion control.

While the above-described first mode of implementation shows an example in which both of the packet transmission function and the quality deterioration monitoring function are mounted on the packet transmission and quality deterioration monitoring device 11-1 as a single device, the packet transmission device may comprise a communication quality monitoring device having the quality deterioration monitoring function. Structuring the packet transmission device to include other components than the threshold value calculating unit 11-17 and the deterioration determining unit 11-18 enable the communication quality monitoring device to be realized only by comprising the threshold value calculating unit 11-17 and the deterioration determining unit 11-18 as a minimum component.

Also in this case, it is possible to determine whether communication quality is deteriorated irrespectively of data loss generation/non-generation by calculating a deterioration determination threshold value of a buffer length for the determination of deterioration according to a congestion state.

While the second mode of implementation has been described with respect to a structure in which the quality deterioration monitoring device 12-5 comprises the state information reception unit 12-51, the state storage unit 12-52, the calculation value calculating unit 12-53 and the deterioration determining unit 12-54, it can be realized only by comprising the threshold value calculating unit 12-53 and the deterioration determining unit 12-54 as a minimum component.

In this case, communication quality deterioration can be determined irrespectively of data loss generation/non-generation by obtaining a buffer state and a session state stored in the packet transmission device 12-1 side and calculating a deterioration determination threshold value of a buffer length for the determination of deterioration according to a congestion state.

Although the present invention has been described with respect to the preferred modes of implementation and exemplary embodiment in the foregoing, the present invention is not necessarily limited to the above-described modes of implementation and exemplary embodiment and can be implemented in various modifications within the scope of its technical idea.

What is claimed is:

1. A communication quality monitoring device which detects deterioration in communication quality based on a buffer length of a session control protocol, comprising:
a threshold value calculating unit which calculates a threshold value for the determination of deterioration in communication quality based on only a parameter related to congestion detection of said session control protocol which includes the number of retransmissions or the number of packet loss detections or a packet loss rate;
a deterioration determining unit which determines deterioration in communication quality by comparing said threshold value and the buffer length;
a buffer state monitoring unit which monitors a buffer length of a buffer for temporarily preserving data to be transmitted by session control;
a session state monitoring unit which monitors a session control parameter including a parameter related to a communication rate and a parameter related to congestion detection; and
a state storage unit which stores said buffer length and said parameter related to session control, wherein
said threshold value calculating unit calculates said threshold value according to said parameter related to congestion detection stored in said state storage unit,
wherein said threshold value calculating unit comprises
a congestion state determination processing unit which determines whether it is in a congestion state or a non-congestion state according to said parameter related to congestion detection,
a congestion time threshold value calculation processing unit which calculates said threshold value for the determination of deterioration for a case of the determination of the congestion state, and
a non-congestion time threshold value calculation processing unit which calculates said threshold value for the determination of deterioration for a case of the determination of the non-congestion state,
wherein said congestion time threshold value calculation processing unit calculates said threshold value for the determination of deterioration according to a variation range of said buffer length,
wherein said congestion time threshold value calculation processing unit calculates said threshold value for the determination of deterioration based on a congestion control model expression for session control,
wherein said congestion time threshold value calculation processing unit calculates said threshold value for the determination of deterioration by obtaining a maximum value of a buffer length for a case where a communication rate is reduced due to congestion prevention based on a congestion control model expression for session control and using the obtained maximum value.

2. The communication quality monitoring device according to claim 1, wherein said congestion time threshold value calculation processing unit calculates said threshold value for the determination of deterioration according to a statistical value of past variation of said buffer length.

3. The communication quality monitoring device according to claim 2, wherein said congestion time threshold value calculation processing unit calculates said threshold value by calculating a plurality of maximal values of past variation of said buffer length and using an average of the calculated plurality of maximal values.

4. The communication quality monitoring device according to claim 1, wherein said congestion time threshold value calculation processing unit obtains said maximum value by obtaining a period from a time point where reduction in the communication rate occurs due to an arbitrary number of congestion preventions in succession until when the communication rate as of before the reduction is restored according to a communication rate parameter increase model expression for congestion control of session control and adding a buffer length as of before the congestion prevention to a value obtained by integrating said model expression by said period.

5. The communication quality monitoring device according to claim 2, wherein said non-congestion time threshold value calculation processing unit calculates said threshold value for the determination of deterioration by using a fact that in the non-congestion state, at the time of communication quality deterioration, buffer length change at intervals of more than a predetermined time tends to be monotonously increased.

6. The communication quality monitoring device according to claim 5, wherein said non-congestion time threshold value calculation processing unit calculates said threshold value for the determination of deterioration by using a buffer length as of a time point where the determination of non-congestion is made.

7. The communication quality monitoring device according to claim 5, wherein said non-congestion time threshold value calculation processing unit calculates said threshold value for the determination of deterioration by estimating a buffer length as of a time point where a buffer length to be compared by said deterioration determining unit is measured from buffer lengths at a plurality of past time points and using the estimated buffer length.

8. A communication system including a communication device which executes communication by a session control protocol and a communication quality monitoring device which is connected to the communication device through a communication network to detect deterioration in communication quality based on a buffer length of the session control protocol, wherein said communication quality monitoring device comprising:
a threshold value calculating unit which calculates a threshold value for the determination of deterioration in communication quality based on only a parameter related to congestion detection of said session control protocol which includes the number of retransmissions or the number of packet loss detections or a packet loss rate;
a deterioration determining unit which determines deterioration in communication quality by comparing said threshold value and the buffer length;
a buffer state monitoring unit which monitors a buffer length of a buffer for temporarily preserving data to be transmitted by session control;
a session state monitoring unit which monitors a session control parameter including a parameter related to a communication rate and a parameter related to congestion detection; and
a state storage unit which stores said buffer length and said parameter related to session control, wherein
said threshold value calculating unit calculates said threshold value according to said parameter related to congestion detection stored in said state storage unit,
wherein said threshold value calculating unit comprises
a congestion state determination processing unit which determines whether it is in a congestion state or a non-congestion state according to said parameter related to congestion detection,
a congestion time threshold value calculation processing unit which calculates said threshold value for the determination of deterioration for a case of the determination of the congestion state, and
a non-congestion time threshold value calculation processing unit which calculates said threshold value for the determination of deterioration for a case of the determination of the non-congestion state,
wherein said congestion time threshold value calculation processing unit calculates said threshold value for the determination of deterioration according to a variation range of said buffer length,
wherein said congestion time threshold value calculation processing unit calculates said threshold value for the determination of deterioration based on a congestion control model expression for session control,
wherein said congestion time threshold value calculation processing unit calculates said threshold value for the determination of deterioration by obtaining a maximum value of a buffer length for a case where a communication rate is reduced due to congestion prevention based on a congestion control model expression for session control and using the obtained maximum value.

9. The communication system according to claim 8, wherein said congestion time threshold value calculation processing unit calculates said threshold value for the determination of deterioration according to a statistical value of past variation of said buffer length.

10. The communication system according to claim 9, wherein said congestion time threshold value calculation processing unit calculates said threshold value by calculating a plurality of maximal values of past variation of said buffer length and using an average of the calculated plurality of maximal values.

11. The communication system according to claim 8, wherein
said non-congestion time threshold value calculation processing unit calculates said threshold value for the determination of deterioration by using a fact that in the non-congestion state, at the time of communication quality deterioration, buffer length change at intervals of more than a predetermined time tends to be monotonously increased.

12. The communication system according to claim 11, wherein said non-congestion time threshold value calculation processing unit calculates said threshold value for the determination of deterioration by using a buffer length as of a time point where the determination of non-congestion is made.

13. A communication quality monitoring method of detecting deterioration in communication quality based on a buffer length of a session control protocol, comprising:
a threshold value calculating step of calculating a threshold value for the determination of deterioration in communication quality based on only a parameter related to congestion detection of said session control protocol which includes the number of retransmissions or the number of packet loss detections or a packet loss rate;
a deterioration determining step of determining deterioration in communication quality by comparing said threshold value and the buffer length;

a congestion state determining step of determining whether it is in a congestion state or a non-congestion state according to said parameter related to congestion detection;

a congestion time threshold value calculating step of calculating said threshold value for the determination of deterioration for a case of the determination of the congestion state; and a non-congestion time threshold value calculating step of calculating said threshold value for the determination of deterioration for a case of the determination of the non-congestion state, wherein said threshold value calculating step comprises a congestion state determination processing step which determines whether it is in a congestion state or a non-congestion state according to said parameter related to congestion detection, a congestion time threshold value calculation processing step which calculates said threshold value for the determination of deterioration for a case of the determination of the congestion state, and a non-congestion time threshold value calculation processing step which calculates said threshold value for the determination of deterioration for a case of the determination of the non-congestion state, wherein said congestion time threshold value calculation processing step calculates said threshold value for the determination of deterioration according to a variation range of said buffer length, wherein said congestion time threshold value calculation processing step calculates said threshold value for the determination of deterioration based on a congestion control model expression for session control, wherein said congestion time threshold value calculation processing step calculates said threshold value for the determination of deterioration by obtaining a maximum value of a buffer length for a case where a communication rate is reduced due to congestion prevention based on a congestion control model expression for session control and using the obtained maximum value.

14. The communication quality monitoring method according to claim 13, wherein at said congestion time threshold value calculating step, said threshold value for the determination of deterioration is calculated according to a statistical value of past variation of said buffer length.

15. The communication quality monitoring method according to claim 14, wherein at said congestion time threshold value calculating step, said threshold value is calculated by calculating a plurality of maximal values of past variation of said buffer length and using an average of the calculated plurality of maximal values.

16. The communication quality monitoring method according to claim 15, wherein at said non-congestion time threshold value calculating step, said threshold value for the determination of deterioration is calculated by using a fact that in the non-congestion state, at the time of communication quality deterioration, buffer length change at intervals of more than a predetermined time tends to be monotonously increased.

17. The communication quality monitoring method according to claim 16, wherein at said non-congestion time threshold value calculating step, said threshold value for the determination of deterioration is calculated by using a buffer length as of a time point where the determination of non-congestion is made.

18. A non-transitory computer-readable medium storing a communication quality monitoring program to be executed on a computer device which detects deterioration in communication quality based on a buffer length of a session control protocol, which communication quality monitoring program causes said computer device to execute a threshold value calculating processing of calculating a threshold value for the determination of deterioration in communication quality based on only a parameter related to congestion detection of said session control protocol which includes the number of retransmissions or the number of packet loss detections or a packet loss rate;

a deterioration determining processing of determining deterioration in communication quality by comparing said threshold value and the buffer length;

a congestion state determining processing of determining whether it is in a congestion state or a non-congestion state according to said parameter related to congestion detection;

a congestion time threshold value calculating processing of calculating said threshold value for the determination of deterioration for a case of the determination of the congestion state; and a non-congestion time threshold value calculating processing of calculating said threshold value for the determination of deterioration for a case of the determination of the non-congestion state, wherein said threshold value calculating processing comprises a congestion state determination processing which determines whether it is in a congestion state or a non-congestion state according to said parameter related to congestion detection, a congestion time threshold value calculation processing which calculates said threshold value for the determination of deterioration for a case of the determination of the congestion state, and a non-congestion time threshold value calculation processing which calculates said threshold value for the determination of deterioration for a case of the determination of the non-congestion state, wherein said congestion time threshold value calculation processing calculates said threshold value for the determination of deterioration according to a variation range of said buffer length, wherein said congestion time threshold value calculation processing calculates said threshold value for the determination of deterioration based on a congestion control model expression for session control, wherein said congestion time threshold value calculation processing calculates said threshold value for the determination of deterioration by obtaining a maximum value of a buffer length for a case where a communication rate is reduced due to congestion prevention based on a congestion control model expression for session control and using the obtained maximum value.

19. The non-transitory computer-readable medium according to claim 18, wherein said congestion time threshold value calculating processing includes processing of calculating said threshold value for the determination of deterioration according to a statistical value of past variation of said buffer length.

20. The non-transitory computer-readable medium according to claim 19, wherein said congestion time threshold value calculating processing includes processing of calculating said threshold value by calculating a plurality of maximal values of past variation of said buffer length and using an average of the calculated plurality of maximal values.

21. The non-transitory computer-readable medium according to claim 18, wherein said non-congestion time threshold value calculating processing includes processing of calculating said threshold value for the determination of deterioration by using a fact that in the non-congestion state, at the time of communication quality deterioration, buffer length change at intervals of more than a predetermined time tends to be monotonously increased.

22. The non-transitory computer-readable medium according to claim 21, wherein said non-congestion time threshold value calculating processing includes processing of calculating said threshold value for the determination of deterioration by using a buffer length as of a time point where the determination of no-congestion is made.

\* \* \* \* \*